Feb. 2, 1943.   G. W. WILSON   2,309,723
CONVEYER
Filed Nov. 14, 1940
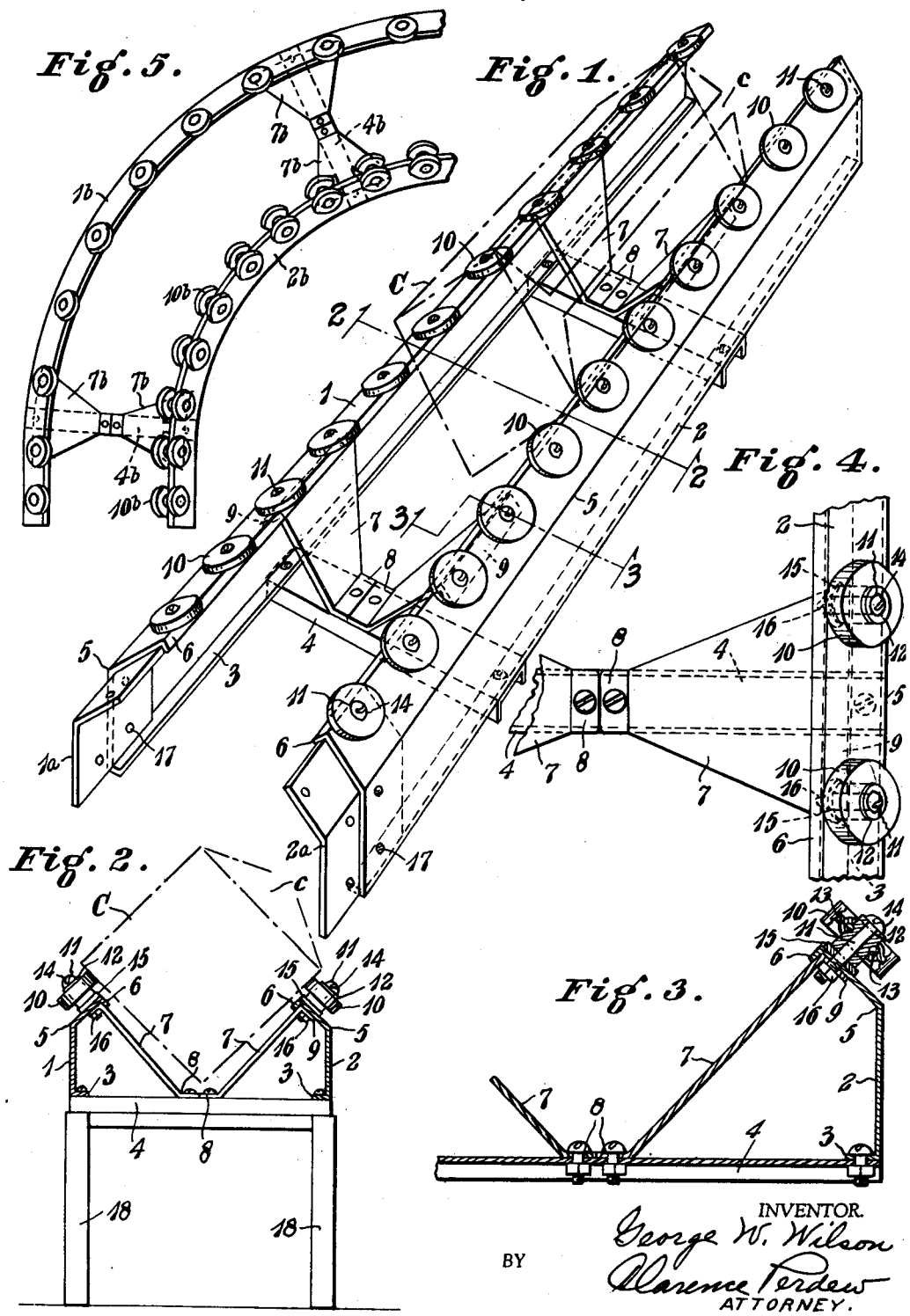
INVENTOR.
George W. Wilson
BY Clarence Perdew
ATTORNEY.

Patented Feb. 2, 1943

2,309,723

UNITED STATES PATENT OFFICE 2,309,723

CONVEYER

George W. Wilson, Reading, Ohio

Application November 14, 1940, Serial No. 365,573

3 Claims. (Cl. 193—35)

My invention relates to conveyers for conveyance of containers, such as cartons or the like, either empty or filled. It more especially relates to conveyers for such purposes in which rollers successively support the conveyed objects as the objects reach the rollers in course of their travel, and in which the force impelling the objects is gravity.

An object of my invention is to make conveyers of such type especially light yet amply strong, and preferably being readily moved about to various places or into various positions in accordance with the location of objects to be conveyed or with the direction of conveyance of the objects, as conditions may require.

A further object is to make the construction of such conveyers as simple as possible without sacrificing ease and dependability of their operation, or their durability.

Other objects will appear in the course of the following description, in which—

Figure 1 is a perspective view of a section of a conveyer embodying my improvement;

Fig. 2 is a vertical cross section on the line 2—2 of Fig. 1;

Fig. 3 is an enlarged vertical cross section on the line 3—3 of Fig. 1;

Fig. 4 is a plan view of the portion of the conveyer illustrated in Fig. 3, on the same scale; and Fig. 5 is a plan view of a curved conveyer section embodying my improvement.

As herein shown, I prefer to construct the conveyer frame of sheet metal, with such disposition of the metal as will permit of the use of very thin metal while providing the strength and durability suiting the conveyer for conveying objects which are relatively heavy; for instance cartons filled with filled bottles. At the same time, I prefer to have the rollers so journaled and so disposed as to permit ready travel of the objects under action of gravity, though the objects be relatively very light, as for instance empty paper-stock cartons carried by the conveyer for reception of the bottles. These instances of use are not limiting, but serve merely to clarify the statement as to the requirements the conveyer is to meet.

Such a preferred construction, herein disclosed for example, comprises side rails 1 and 2, each with a lower inturned flange 3, and cross beams 4 bolted to the flanges to tie the side rails 1 and 2 together at their bottoms. These cross beams 4, as here shown, are channels with their flanges depending from their webs, which latter abut upwardly against and are bolted to the rail flanges 3.

The top portion of each rail 1 or 2 is bent at 5 to incline inwardly; and preferably this top portion is bent down along its free edge, forming a narrow flange 6. Associated with each cross beam 4 is a pair of braces 7. Each brace 7 has its lower end part bent to form an ear 8 which is bolted to the top of the web of the respective cross beam 4. The upper end part of each brace is bent to form a flange 9 to fit under the upper inwardly inclined portion of the respective side rail 1 or 2, with the end of the brace 7 fitting snugly up into the bend by which the narrow free edge flange 6 of the upper portion of the side rail is formed, and up against said flange 6. All of these parts, the side rails 1 and 2, the cross beams 4, and the braces 7, preferably are of relatively very thin sheet metal as before mentioned.

The rollers 10, of disk shape, are of any suitable material, preferably, as herein shown, of formed sheet metal, and rotate on axes that are inclined, those at each side away from those at the other side, in upward extent. The rollers 10 thus are presented to sides of an object that diverge upwardly, as the carton seen in broken lines in Figs. 1 and 2.

The spindle 11 of each roller 10, is, as here shown, a bolt extending through the central aperture of the roller and surrounded by the inner core 12 of a ball bearing, with a race for the balls 13 which have their outer race in the edge of the roller aperture. Core 12 extends above and below the sides of the roller 10; and the spindle bolt 11 has its head 14 against the upper end of this core 12, while a washer 15 is interposed between the lower end of core 12 and the upper inwardly inclined portion of the rail 1 or 2. The spindle bolt 11 extends through this rail portion and through the upper end flange 9 of the brace 7; receiving a nut 16 which is held against turning by the adjacent part of brace 7, after the assembly of rail 1 or 2 and ball bearing core 12 has been made tightly unitary by drawing down the spindle-bolt 11 by acting on its head 14. This head 14 may be slotted as shown, or may be angular or otherwise provided for turning the spindle bolt 11.

The narrow flange 6 is abutted by the brace 7, upwardly, so that a V fitting is made and the flange 6 resists inward swinging of the lower end part of the spindle 11 and its nut 16 and also resists outward swinging of rail 1 or 2, i. e., reinforces the connection of brace 7 to the rail in this latter resistance.

The rollers 10 are spaced along the rails 1 and 2 at suitable intervals, as for instance so that four pairs of rollers are within the length of carton C in Fig. 1. This is not limiting, as the spacing of the rollers may vary according to the conditions to be met.

As here shown, each brace 7 is widened from its lower end ear 8 upwardly, so that at its top its flange 9 extends under two rollers 10 on the respective rail 1 or 2, to receive the two spindles 11 and thereby be rigidly secured to the rail upper portion by both spindles, in the manner above described. This disposition of the brace metal permits each brace 7 to act as a double gusset to resist distortion of the conveyer frame in the plane of its length and width. At the lower end of Fig. 1 are shown end portions 1a and 2a of an adjacent section of conveyer fitted into the end portions of the respective rails 1 and 2, with bolts 17 through the telescoping end parts clamping the sections rigidly together. It will be understood that any desired number of the sections thus may be assembled, to make up a conveying system of any desired extent. Also, as shown in Fig. 5, a curved section, of rails 1b and 2b, cross beams 4b, and braces 7b, may be provided where a change of direction of the conveying system is required. The rollers 10 will be understood to be, with their associated parts, like those above described. However, in the curve, the outer rail 1b is elevated above the inner rail 2b, while retaining the slope of the conveyer structure lengthwise; and preferably, in this curved section, there is a second roller 10b on the spindle 11, the mounting of which, with its bearing, will be understood as being like that of the upper roller 10. Such second or lower roller 10b extends through a respective slot in the brace 7b where the rollers are associated with the brace.

The carton C rests on the rollers 10 in slanted posture, as indicated by the broken lines in Figs. 1 and 2. Due to this posture of the conveyed object, side guide rails, found in numerous conveyers of the prior art, are unnecessary. Also, the object, such as carton C is so disposed that its open top c is readily receptive of the articles, such as bottles, which may be carried to the packers along a belt conveyer, not shown, alongside my conveyer.

As the cartons C or the like, wedge somewhat between the rollers 10, they are more steadily conveyed than are those on, for instance, horizontal rollers associated with some side guiding means, with relation to which the carton must have some substantial clearance. On a curved section, as shown in Fig. 5 and above described, the cartons, being chordal to the curve, simply rise as a result of this and as simply become lowered as they leave the curve. Since the weight of the carton C, due to its wedging relation to rollers 10, tends to spread the upper portions of rails 1 and 2, or 1b and 2b, apart, the braces 7 or 7b resist this spreading in tension, so that the braces may have a minimum cross section, as compared with a disposition of conveyer elements and carried object in which braces would resist under compression. Also, the cross-sectional bends of the rails 1 and 2, or 1b and 2b, at 5, thereby resulting in a shallow V-shape for the cross section, makes each rail highly resistant, both to vertical load and to the spreading tendency.

It is due to these dispositions of the frame material, and, by the dispositions of the rollers to act not only as supports for the load vertically but as guides laterally, dispensing with side guides, that I am enabled to provide a light conveyer system, compared with the loads to be conveyed. The conveyer sections may be mounted on legs 18, Fig. 2, to rest on a floor; or, as will be understood, they may be supported on wall brackets, hangers or other means. It will be understood that the rails, cross beams and braces may be welded together, or otherwise secured rigidly together, instead of the bolting disclosed. Modifications other than those mentioned may occur, as to materials, construction and use; and therefore while I have described my invention somewhat specifically, I am not limited to such precise disclosure, but what I claim as new and desire to secure by Letters Patent is:

1. In a conveyer of the kind that comprises side rails and rotatable elements arranged along said rails on upwardly outwardly inclined axes, to support objects for travel of the objects along said rails with the middle portions of the objects depending between the rails, and cross beams connecting lower portions of said rails and pairs of upwardly diverging braces, each pair connected to the middle part of a respective cross beam and extending to the upper portions of respective opposite rails, a structure characterized in that each rail has its upper portion inclined inwardly toward the other rail and has along its inner upper edge a depending flange, and in that each brace bears inwardly and upwardly against the respective rail edge flange and has an end flange extending along the under side of the rail upper inclined portion, and in that each rotatable element has a bearing core at the outer upper side of the respective rail upper inclined portion, and means rigidly securing together the core, the rail upper inclined portion and the brace end flange.

2. A conveyer comprising side rails, cross beams connecting lower portions of said rails, braces connecting the cross beams with the upper portions of said rails, and means along the upper portions of said rails for supporting an object and facilitating travel of the object along said rails, the arrangement and proportions of said rails, cross beams and braces being such as to leave a space below and between said rails for entrance of the lower part of the object, whereby the object may wedge between the supporting means of the rails sufficiently to be steadily guided as well as be supported by said means, the structure of said conveyer being characterized in that the means along the upper portions of the rails include rotatable elements, the axis of the elements on each rail inclining away from the other rail, upwardly, and in that each brace in its upper portion is of width to underlie, at each rail, a plurality of said rotatable elements, and in that the bearing means of the respective elements also constitute connections of said brace upper parts to the rail upper portions.

3. A conveyer comprising side rails, cross beams connecting lower portions of said rails, braces connecting the cross beams with the upper portions of said rails, and means along the upper portions of said rails for supporting an object and facilitating travel of the object along said rails, the arrangement and proportions of said rails, cross beams and braces being such as to leave a space below and between said rails for entrance of the lower part of the object, whereby the object may wedge between the supporting means of the rails sufficiently to be steadily guided as well as be supported by said means, the structure of said conveyer being characterized in that the means along the upper portions of the rails include rotatable elements, the axes of the elements on each rail inclining away from the other rail, upwardly, said rails following curves, and the rotatable elements on the radially inner rail being in pairs in which the two elements are axially spaced.

GEORGE W. WILSON.